United States Patent [19]

Murayama et al.

[11] Patent Number: 4,839,242
[45] Date of Patent: Jun. 13, 1989

[54] TITANIUM-CLAD STEEL AND A METHOD FOR THE MANUFACTURE THEREOF

[75] Inventors: Junichiro Murayama, Takarazuka; Yuichi Komizo, Nishinomiya, both of Japan

[73] Assignee: Sumitomo Metal Industries, Ltd., Osaka, Japan

[21] Appl. No.: 17,754

[22] Filed: Feb. 24, 1987

[30] Foreign Application Priority Data

| Feb. 24, 1986 | [JP] | Japan | 61-038887 |
| Jan. 19, 1987 | [JP] | Japan | 62-009552 |
| Jan. 19, 1987 | [JP] | Japan | 62-009554 |

[51] Int. Cl.⁴ .......................................... B32B 15/18
[52] U.S. Cl. .................................. 428/660; 428/679; 428/684
[58] Field of Search .............. 428/679, 684, 660, 925, 428/940; 228/263.21, 235, 243

[56] References Cited

U.S. PATENT DOCUMENTS

| 2,786,265 | 3/1957 | Keay | 428/660 |
| 2,813,332 | 11/1957 | Keay | 428/660 |
| 2,908,966 | 10/1959 | Wagner | 428/660 |
| 2,985,955 | 5/1961 | Rostokon et al. | 428/660 |
| 3,015,885 | 1/1962 | McEven et al. | 428/660 |
| 3,854,891 | 12/1974 | Chivinsky | 428/684 |
| 4,023,936 | 5/1977 | Morse et al. | 482/679 |
| 4,514,470 | 4/1985 | Rosenthal et al. | 428/675 |
| 4,612,259 | 9/1986 | Ueda | 428/660 |

FOREIGN PATENT DOCUMENTS

759468  10/1956  United Kingdom ............... 428/660

*Primary Examiner*—John J. Zimmerman
*Attorney, Agent, or Firm*—Burns, Doane, Swecker & Mathis

[57] ABSTRACT

A titanium-clad steel and a method for its manufacture are disclosed. The titanium-clad steel comprises a steel base metal, a nickel insert which is bonded to the steel base metal, a low-carbon ferrous metal insert which contains at most 0.01 weight % of carbon and which is bonded to the nickel insert, and cladding of a titanium-based metal which is bonded to the low-carbon ferrous metal insert. A manufacturing method therefor comprises preparing a 4-layer clad assembly comprising the above materials, sealing the outer seams of the clad assembly by shielded arc welding, performing degassing treatment on at least the confronting surfaces of the inserts, heating the clad assembly to a temperature of 500°–1050° C., and performing hot rolling. The resulting titanium-clad steel has a high bonding strength.

8 Claims, 9 Drawing Sheets

TITANIUM-CLAD STEEL AND A METHOD FOR THE MANUFACTURE THEREOF

BACKGROUND OF THE INVENTION

This invention relates to a titanium-clad steel which is manufactured by rolling and to a method for its manufacture. More particularly, it relates to a titanium-clad steel which includes inserts in the form of a low-carbon ferrous metal sheet and a nickel or nickel alloy sheet.

Clad metal sheets have come to be widely used due to the fact that they take advantage of the favorable properties of both the base metal and the cladding. Titanium-clad steels, for example, are useful in manufacturing desalination apparatuses. There is now particular interest in titanium-clad steels because the steel base metal compensates for the drawbacks of the titanium cladding.

At present, titanium-clad steel is manufactured either by the explosive cladding method or by the rolling method in which a low-carbon ferrous metal sheet or industrial-grade pure iron sheet (hereunder collectively referred to as a "low-carbon ferrous metal") is used as an insert.

The explosive cladding method has the drawback that there is a limitation on the size of a slab which can be assembled, and the dimensions of the resulting product are therefore small. The dimensional accuracy of the product is also poor, and the cladding tends to be lacking in uniformity. Furthermore, SR (stress relief heat treatment) produces a large decrease in the bonding strength of a clad steel produced by this method. Accordingly, the explosive cladding method is not satisfactory for general use.

In the rolling method, titanium cladding is bonded to a steel base metal by rolling at a high temperature. If the cladding is directly bonded to the steel without an insert therebetween, TiC will precipitate along the interface between the base metal and the Ti cladding. This TiC is extremely hard and brittle and inevitably produces a deterioration in the bonding strength of the clad steel, which is highly undesirable. Therefore, an insert in the form of a sheet of a low-carbon ferrous metal is usually disposed between the Ti cladding and the steel base metal in order to restrict the precipitation of TiC. However, the use of such an insert is not sufficient to solve the problem of TiC precipitation, since C has a high diffusion rate in Fe, so that C from the base metal readily passes through the insert, reaches the interface between the Ti cladding and the insert, and forms TiC. The diffusion of C through the insert is decreased as the thickness of the insert is increased, but only to a certain extent, since C in the base metal can readily pass along grain boundaries in the insert. Furthermore, the tendency for C to diffuse increases as the heating temperature is increased. Diffusion of C becomes even easier if stress relief heat treatment is performed after the thickness of the clad steel has been decreased by rolling. Thus, with the recent tendency to manufacture clad steel from thin layers which are subjected to a large amount of working, and the tendency to perform rolling at high temperatures in order to increase the reduction ratio and increase productivity, the formation of TiC in the manufacture of clad steel by rolling has become a major problem.

Japanese Patent Application Laid-Open Specification No. 53-94249 (1978) discloses a method of manufacturing titanium-clad steels in which an industrial-grade pure iron insert is employed Prior to assembly, the pure iron insert is provided on a titanium plate by means of electroplating or explosive cladding.

Japanese Patent Application Laid-Open Specification No. 56-122681 (1981) discloses a method of manufacturing titanium-clad steels in which a ultra-low carbon steel is employed as an insert or base metal. The ultra-low carbon steel comprises 0.07% or less of carbon, 0.01–0.50% of silicon, 0.30–2.00% of manganese, and at least one carbon-fixing element, such as Ti: 0.01–0.50%, Ti/C=3 or more; Nb: 0.05–0.30%, Nb/C=5 or more, and Mo: 0.05–1.00%.

Japanese Patent Application No. 58-29589 (1983) discloses a method of manufacturing titanium-clad steels in which a first insert member selected from niobium, niobium alloys, tantalum, and tantalum alloys, and a second insert member selected from copper, copper alloys, nickel, and nickel alloys are employed The first and second inserts are bonded by an explosive bonding method or diffusion bonding method and the thickness is reduced by rolling prior to assembly. The thus-combined first and second thin inserts are disposed between a titanium plate and a steel base plate, and are bonded together by an explosive bonding method, diffusion bonding method, or rolling bonding method. This process is rather complicated and costly.

SUMMARY OF THE INVENTION

It is therefore an object of the present invention to provide a titanium-clad steel which is free from precipitation of TiC and which therefore has a high bonding strength, even when the rolling temperature is high.

It is another object of the present invention to provide a titanium-clad steel in which there is no precipitation of TiC even when stress relief heat treatment is performed after rolling.

It is yet another object of the present invention to provide a method for the manufacture of a titanium-clad steel having the above-described properties.

As a result of various experiments, the present inventors found that the precipitation of TiC in a titanium-clad steel can be prevented by disposing a low-carbon ferrous metal insert together with a nickel insert between titanium cladding and a steel base metal, the low-carbon ferrous metal insert being adjacent to the cladding and the nickel insert being adjacent to the base metal. An insert of a low-carbon ferrous metal disposed adjacent to a layer of Ti cladding forms a mutual diffusion layer, while an Ni insert disposed between the low-carbon ferrous metal insert and the steel base metal slows down the diffusion of carbon from the steel base metal. As a result, the precipitation of TiC and the formation of brittle intermetallic compounds are effectively prevented, whether only hot rolling is performed o whether stress relief heat treatment is also carried out subsequent to the hot rolling, resulting in a clad steel having superior bonding strength.

A titanium-clad steel according to the present invention comprises a cladding layer of a titanium-based metal, a low-carbon ferrous metal insert containing at most 0.01 weight % of carbon which is bonded to the cladding layer, a nickel or nickel alloy insert which is bonded to the low-carbon ferrous metal insert, and a steel base metal which is bonded to the nickel insert A method for the manufacture of a titanium-clad steel in accordance with the present invention comprises first forming a clad assembly comprising a cladding layer of a titanium-based metal, a low-carbon ferrous metal insert containing at most 0.01 weight % of carbon which is disposed next to the cladding layer, a nickel or nickel alloy insert which is disposed next to the low-carbon ferrous metal insert, and a steel base metal which is disposed next to the nickel insert. The outer edges of the layers of the clad assembly are sealed by means of welding so that bonding surfaces of each the layers are protected from oxidation, and at least the adjoining surfaces of the cladding layer and the low-carbon ferrous metal insert are subjected to degassing treatment under a reduced pressure, at most 0.1 Torr, for example. The clad assembly is then hot rolled in the temperature range of 500°–1050° C.

In the present invention, a "titanium-based metal" includes pure titanium and alloys thereof. A "low-carbon ferrous metal" includes industrial-grade pure iron and low-carbon steels containing at most 0.01 weight % of carbon.

A "nickel alloy" includes nickel alloys in general, and preferably alloys containing 25% by weight or more of Ni. In a further preferred embodiment, the nickel alloys are Fe—Ni—Cr based alloys comprising:

| Cr ≦ 18%, | Ni ≧ −0.78 Cr + 26% |
|---|---|
| Cr > 18%, | Ni ≧ 1.13(Cr − 18%) + 12% |

The Fe—Ni—Cr alloys may include at most 0.05% by weight of carbon, as well as a total of 5.0% by weight of the other alloying elements, such as Mn, Si, Al, Mo, Ti and Nb.

Furthermore, the nickel or nickel alloy mentioned above may be provided in a form of a bonded layer, such as an electroplated layer, an electrolessly-plated layer, a vapor deposited layer, and a sprayed layer.

The low-carbon ferrous metal may be provided in the form of a layer which is bonded onto a nickel or nickel alloy insert.

The present invention is based on the knowledge that in order to bond Ti cladding to a steel base metal with a high bonding strength, it is important to cause mutual diffusion of Ti and Fe without precipitation of TiC along the interface of the Ti cladding and a low-carbon ferrous metal insert. Furthermore, if a rolled Ti-clad steel is subjected to stress relief heat treatment, the precipitation of TiC is further promoted and the bonding strength decreases. It is thus important that C not reach the interface between the Ti cladding and the insert. Therefore, in accordance with the present invention, a low-carbon ferrous metal sheet is used as an insert between the cladding and the base metal on the side adjacent to the cladding, and a Ni or Ni alloy insert which has a low diffusion coefficient with respect to C is used as an insert on the side adjacent the steel base metal. It is also known that if an oxide layer forms on the surfaces of the cladding, the inserts, and the base metal during heating prior to rolling, the mutual diffusion of Ti and Fe does not take place. Therefore, in the present invention, vacuum degassing treatment is performed prior to heating in order to prevent the formation of oxide layers.

The necessary thickness of the Ni insert to achieve a desired strength depends on the heating temperature, the heating time, and the thickness of the low-carbon ferrous metal insert in a manner which will be described further on.

Prior to rolling, the clad assembly which is used to manufacture clad steel according to the present invention is heated to a prescribed temperature. If oxygen is supplied to the surfaces to be bonded, oxide layers form on the surfaces and prevent the mutual diffusion which is the basis for solid-phase bonding, as mentioned above. To prevent the formation of such an oxide layer, it is desirable that sealing of the clad assembly be performed by welding and that degassing treatment be performed under a reduced pressure, at most 0.1 Torr, for example. Since the melting point of the intermetallic compounds which form along a Ti/Fe interface is 1085° C., the upper limit on the heating temperature at this time is set at 1050° C.

In order to suppress the diffusion of C from a steel base metal such as JIS SS41 steel, it is preferable to increase the thickness of the low-carbon ferrous metal insert. However, if the thickness of the insert exceeds 2 mm, the strength of the clad steel in shear tests becomes the shear strength of the insert, which is not desirable.

DESCRIPTION OF THE PREFERRED EMBODIMENTS

A titanium-clad steel and a method for its manufacture in accordance with the present invention will now be described while referring to the accompanying drawings.

Figure 1:
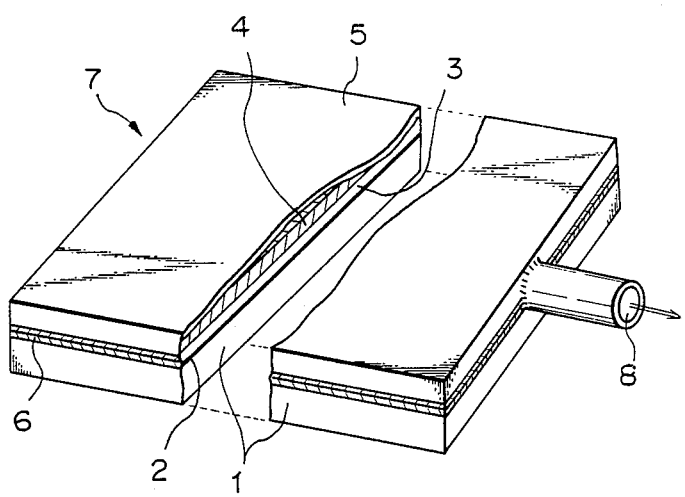
FIG. 1 is a cutaway perspective view of a clad assembly as it would appear during the manufacturing method of the present invention.

FIG. 1 is a cutaway perspective view of a clad assembly during the manufacture of a titanium-clad steel sheet by the method of the present invention. The structure of the final product is the same as that of the assembly illustrated in the figure. As shown in FIG. 1, a nickel insert 2 made from a sheet of nickel or nickel alloy is disposed atop a steel base metal 1, and a low-carbon ferrous metal insert 3 made from a sheet of pure iron or low-carbon steel is disposed atop the nickel insert 2. Titanium cladding 4 made from a sheet of a titanium-based metal is disposed atop the low-carbon ferrous metal insert 3.

There is no particular limit on the thickness of each layer, but preferably the combined thickness of the two inserts 2 and 3 is about 0.1–10% of the total thickness of all four layers, and more preferably it is 0.5–3.0%.

A method for manufacturing clad steel according to the present invention will now be described. First, a steel base metal, titanium cladding, a nickel insert, and a low-carbon ferrous metal insert are prepared. It is desirable that the surfaces to be bonded be made as clean as possible by degreasing or other suitable treatment.

(1) Preparation of bonded layers

According to one embodiment of the present invention, a low-carbon ferrous metal insert and/or a pure nickel or nickel alloy insert are in the form of a bonded layer.

The "bonded layer" means an adherent metal layer which is previously bonded to and it may be prepared as follows by means of electroplating, electroless plating, vapor deposition, spray coating, and the like.

(i) On one surface of the pure nickel or nickel alloy sheet a bonded layer of a low-carbon ferrous metal (including pure iron) containing 0.01% by weight or less of carbon is formed.

(ii) On one surface of a low-carbon ferrous metal insert a bonded layer of a pure nickel or nickel alloy is formed.

(iii) On one surface of a steel base sheet a bonded layer of a pure nickel or nickel alloy is formed.

(iv) On one surface of a steel base sheet a bonded layer of a pure nickel or nickel alloy is formed, and on this bonded layer another bonded layer of a low-carbon ferrous metal containing 0.01% by weight or less of carbon is formed.

(2) Assembly

The steel base metal, the titanium cladding, and the two inserts are stacked atop one another in the manner shown in FIG. 1. A cover 5 in the form of a low-carbon ferrous metal plate is disposed atop the titanium cladding 4, and the seams 6 running around the outer periphery of the five layers are welded together to form an air-tight clad assembly 7. The welding is performed in a manner so as not to expose the inner surfaces of the layers to the air. The seams 6 are left unsealed in a single location, and at this location, a suction port 8 is welded to the seams 6 so a to communicate with the inside of the clad assembly 7. In order to make the welding of the seams 6 easier, the dimensions of the cladding 4 and the inserts 2 and 3 are preferably slightly smaller than those of the steel base metal 1 and the cover 5.

(3) Degassing

After obtaining the clad assembly 7 as shown in FIG. 1, degassing of the inner surfaces of the clad assembly 7 is performed by connecting a rotary pump or the like to the suction port 8 and lowering the pressure within the clad assembly 7 to 0.1 Torr or less. Degassing is performed at least on the space between the insert 3 and the titanium cladding 4. A vacuum can be more easily achieved if degassing is performed while the clad assembly 7 is heated. After the degassing has been adequately carried out, the suction port 8 is sealed off by welding or other suitable means.

(4) Rolling

After degassing, the clad assembly 7 is heated to a prescribed temperature and then hot rolled. The heating temperature is preferably 500° C.–1050° C. and more preferably is 700° C.–900° C. As for the temperature during rolling, if the finishing temperature is too low, the resistance to deformation increases due to work-hardening and martensitic transformation, and therefore the finishing temperature is preferably at least 400° C. If heating and rolling are performed under these conditions, there is substantially no formation of TiC in a clad steel according to the present invention, and stress relief heat treatment performed subsequent to rolling produces no decrease in strength.

After the completion of rolling, the cover 5 is peeled off the titanium cladding 4, the suction port 8 is cut off, and a finished sheet of clad steel is obtained.

Next, a number of specific illustrative examples of the present invention will be presented. It should be understood that the invention is not limited to the specific details set forth in the examples.

EXAMPLES

In the following examples, a titanium-clad sheet comprising a titanium sheet (10 mm thick) corresponding to JIS H 4600 Type I titanium sheet was used as cladding and a carbon steel sheet (90 mm thick) corresponding to JIS SS41 was used as a base metal.

Furthermore, low-carbon steel sheets and Ni sheets having the chemical compositions shown in Table 1 were used as inserts. The shear strength of clad steel formed from these materials was investigated in accordance with the methods set down by JIS G 3606 and JIS G 0601.

TABLE 1

| Insert | Chemical Composition (Weight %) | | | | | |
|---|---|---|---|---|---|---|
| | C | Si | Mn | P | S | Cu |
| Low-carbon steel sheet | 0.006 | 0.35 | 0.20 | 0.010 | 0.007 | <0.01 |
| Nickel sheet | 0.04 | 0.05 | 0.01 | 0.008 | 0.009 | 0.02 |

COMPARATIVE EXAMPLE 1

First, as a comparative example of a conventional titanium-clad steel, the above-mentioned titanium cladding, the steel base metal, and a low-carbon steel insert were assembled in the manner shown in FIG. 1, but without a nickel insert, to form a clad assembly. Air was removed from the inside of the assembly using a rotary pump through a degassing hole formed in the end of the assembly. After the pressure within the assembly was reduced to 0.11–0.08 Torr, the degassing hole was sealed by welding and the stock was then heated at 850° C. for 5 hours. After heating, the assembly was hot rolled with a reduction ratio of 5. The thickness of the low-carbon steel insert was varied among different samples. After rolling, heat treatment was performed at 600° C. for 5 hours, and then the shear strength of each sample and the amount of TiC precipitation along the interface between the cladding and the insert were measured.

Figure 2:
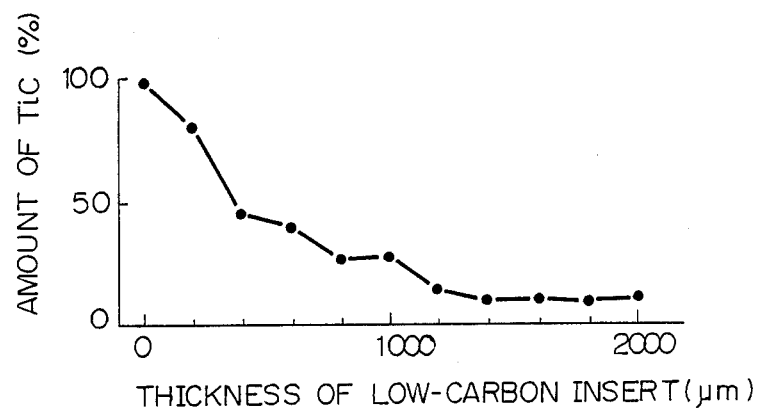
FIG. 2 is a graph showing the amount of TiC precipitation, expressed as a % of area in a three-layer sheet of a conventional titanium-clad steel with a low-carbon steel insert, as a function of the thickness of the insert.

FIG. 2 shows the relationship for these samples between the amount of TiC precipitation and the original thickness of the low-carbon steel inserts prior to rolling. The amount of TiC precipitation was expressed as the percent of the total area of the interface on which there was precipitation.

As is clear from the results of FIG. 2, when no insert is used (thickness of insert=0 mm), TiC precipitation occurs over nearly the entire interface between the cladding and the steel base metal, and the amount of precipitation decreases as the thickness of the insert increases. However, even if a low-carbon steel sheet with a relatively large thickness is used alone as an insert, TiC still precipitates over roughly 10% of the area of the interface. As mentioned previously, this is due to the fact that C readily diffuses along the crystal grain boundaries of a low-carbon steel insert.

Figure 3:
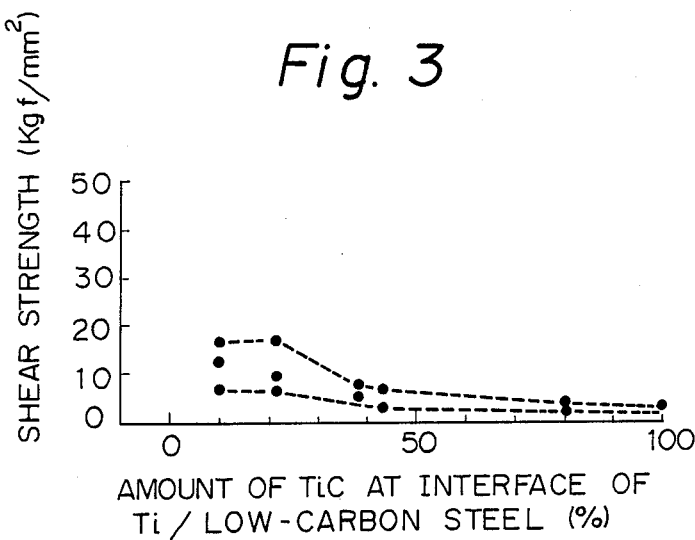
FIG. 3 is a graph showing the shear strength of the conventional titanium-clad steel of FIG. 2 as a function of the amount of TiC precipitation.

FIG. 3 is a graph of the shear strength as a function of the amount of TiC precipitation along the interface between the cladding and the insert of the same samples as for FIG. 2. The amount of TiC precipitation is expressed in the same manner as in FIG. 2. The dotted lines connect the upper and lower limits of the values. This figure clearly shows that the shear strength falls as the amount of TiC precipitation along the interface increases. Furthermore, even when the amount of TiC precipitation is only 10%, the majority of samples had a shear strength which was lower than the shear strength of explosive bonding clad steel (14 kgf/mm²)

COMPARATIVE EXAMPLE 2

Next, samples of a three-layer conventional titanium-clad steel were prepared in the same manner as the samples of FIGS. 2 and 3, heated at 850° C. for 5 hours, rolled with a reduction ratio of 5, and then were further subjected to stress relief heat treatment after rolling by heating in air at 600° C. for 1 hour. The shear strength and amount of TiC precipitation were then investigated in the same manner as for the previous samples. The amount of TiC precipitation (% of area) and the shear strength of these samples are plotted in FIG. 4 as a function of the initial and final thickness (after rolling) of the low-carbon steel inserts in the samples.

Figure 4:
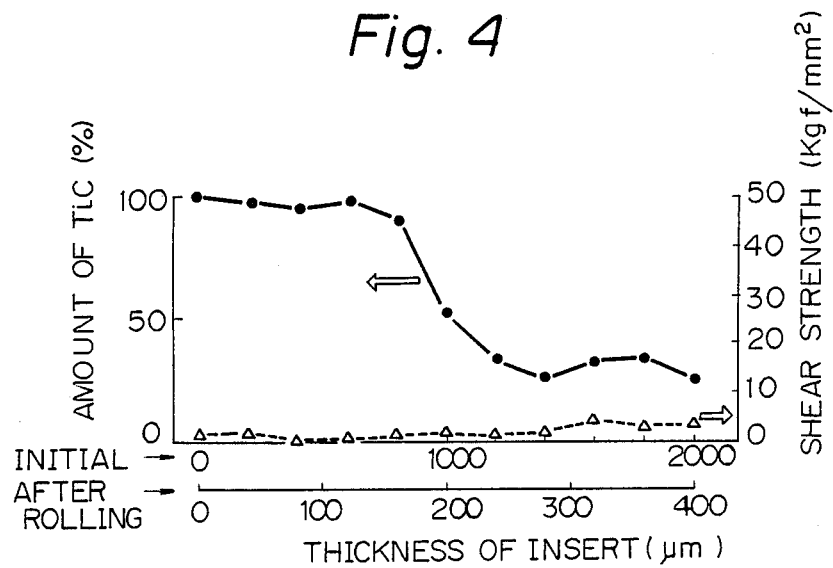
FIG. 4 is a graph of the amount of TiC precipitation and the shear strength of the conventional titanium-clad steel of FIG. 3 which was further subjected to stress relief heat treatment, plotted as a function of the initial and final thickness of the low-carbon steel insert.

It was expected that stress relief heat treatment after the thickness of a low-carbon steel insert had been reduced by rolling would facilitate diffusion of C and increase the amount of TiC precipitation, and by comparing FIG. 2 and FIG. 4, it can be seen that this was in fact the case. For any thickness of the insert, the amount of precipitation shown in FIG. 4 is considerably higher than the amount of precipitation shown in FIG. 2 for the same thickness. This is due to the fact that rolling can reduce the thickness of the insert to less than the diffusion length of C under the conditions prevailing during stress relief heat treatment. For example, if an insert has an initial thickness of 1 mm, the thickness after rolling with a reduction ratio of 5 will be reduced to only 200 μm, and it can be seen that this thickness is less than the diffusion length of C in Fe (220 μm) at 600° C. for 1 hour, resulting in a large amount of TiC precipitation. Thus, even if an insert is as thick as 1-2 mm prior to rolling, if it undergoes significant reduction in L rolling, resulting in a thickness of 200-400 μm, and then is subjected to stress relief heat treatment, the amount of TiC precipitation will be high compared to an as-rolled sheet having an insert of the same thickness. Therefore, even if a conventional titanium-clad steel has a high shear strength after rolling, the strength greatly decreases if stress relief heat treatment is then performed on it.

From the result of FIGS. 2-4, it can be seen that a conventional titanium-clad steel having a low-carbon steel insert does not have adequate strength, even when the insert is very thick.

EXAMPLE 1

Next, samples of a 4-layer titanium-clad steel in accordance with the present invention were prepared by the same method as for the samples of FIG. 2 with the exception that a nickel insert having a thickness of 300 μm and the chemical composition shown in Table 1 was disposed between the low-carbon steel insert and the base metal of SS41 steel. The initial thickness of the low-carbon steel insert varied among the samples from 0 to 2 mm. The resulting clad assembly was heated at 850° C. for 5 hours and then hot rolled with a reduction ratio of 5. The shear strength and the amount of TiC precipitation along the interface between the cladding and the low-carbon steel insert were investigated.

Figure 5:
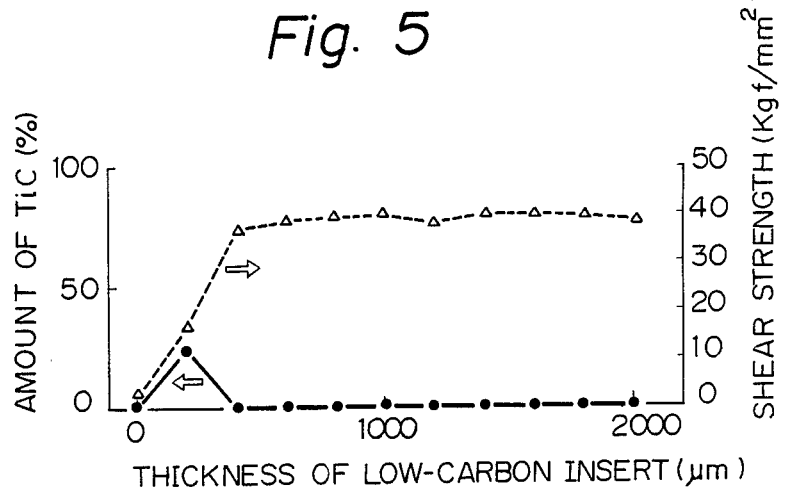
FIG. 5 is a graph of the amount of TiC precipitation and the shear strength of a 4-layer sheet of titanium-clad steel in accordance with the present invention, plotted as a function of the thickness of the low-carbon steel insert.

FIG. 5 shows the amount of TiC precipitation and the shear strength of the as-rolled samples as a function of the initial thickness of the low-carbon steel inserts. As is clear from this figure, when the initial thickness of the low-carbon steel insert was at least 400 μm, there was substantially no TiC precipitation and the clad steel had excellent shear strength which was many time higher than that of a conventional titanium-clad steel having a low-carbon steel insert of the same thickness. FIG. 5 also shows that when the nickel insert was used alone, i.e., when the thickness of the low-carbon steel insert was 0 mm, the shear strength was extremely poor due to the extensive growth of a Ti—Ni intermetallic compound.

Next, samples of a 4-layer titanium-clad steel according to the present invention which were prepared in the same manner as those used for FIG. 5 were heated at 850° C. for 5 hours, hot rolled with a reduction ratio of 5, and then subjected to stress relief heat treatment at 600° C. for 1 hour. The initial thickness of the low-carbon steel insert was varied among the samples from 0 to 2000 μm. After the stress relief heat treatment, the amount of TiC precipitation and the shear strength of the samples were measured.

Figure 6:
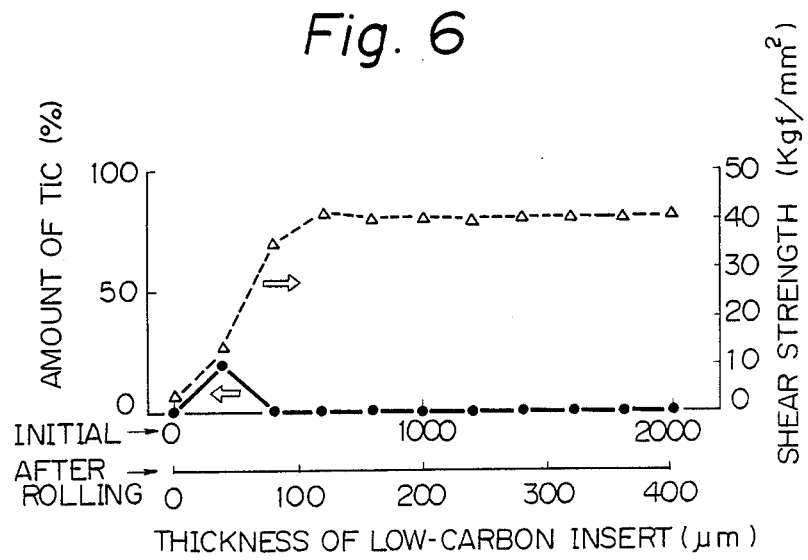
FIG. 6 is a graph of the amount of TiC precipitation and the shear strength of the titanium-clad steel in accordance with the present invention of FIG. 5 which was further subjected to stress relief heat treatment, plotted as a function of the initial and final thickness of the low-carbon steel insert.

The results of measurements are plotted in FIG. 6 as a function of the initial thickness and the final thickness after rolling of the low-carbon steel inserts. As can be seen from this figure, the characteristics of these samples were nearly identical to those of the as-rolled samples of FIG. 5. Namely, if the initial thickness of the low-carbon steel insert was at least 400 μm, there was substantially zero precipitation of TiC and the shear strength was extremely high. This is due to the fact that the diffusion of C in Ni at 600° C. for one hour is nearly zero, so that even though the thickness of the nickel insert had been reduced from 300 μm to 60 μm by rolling, a thickness of 60 μm was fully adequate to prevent the diffusion of C during the stress relief heat treatment, and therefore the stress relief heat treatment produced no increase in TiC precipitation and no decrease in shear strength.

The necessary thicknesses of a low-carbon ferrous metal insert and an Ni insert in order to suppress TiC precipitation along the interface between the titanium cladding and the low-carbon ferrous metal insert depend on the heating temperature and the length of heating. In order to determine the thickness required to achieve a certain shear strength, samples of a 4-layer titanium-clad steel according to the present invention which were prepared in the same manner as those used for FIG. 5 were heated at various temperatures for 5 hours, hot rolled with a reduction ratio of 5, and then subjected to stress relief heat treatment at 600° C. for 1 hour. The thicknesses of both the low-carbon steel inserts and the nickel inserts were varied among the samples. After the stress relief heat treatment, the shear strength of the samples was measured.

Figure 7:
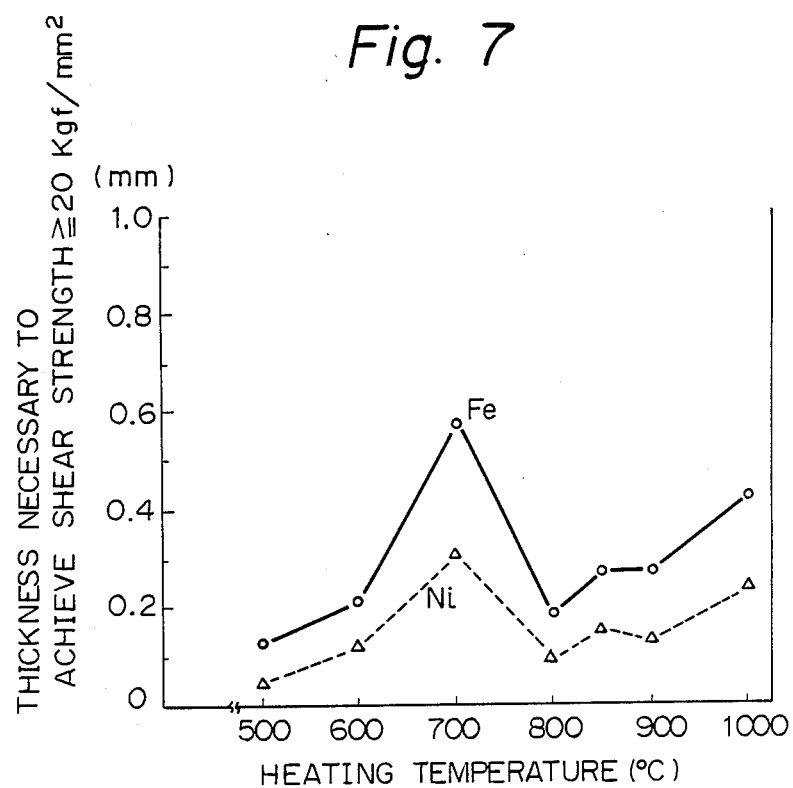
FIG. 7 is a graph of the minimum thickness of a low-carbon steel insert and a nickel insert which are necessary to achieve a titanium-clad in accordance with the present invention having a shear strength of at least 20 kg/mm$^2$.

FIG. 7 shows the minimum thicknesses of the inserts which are necessary in order to achieve a shear strength of at least 20 kgf/mm$^2$, plotted as a function of heating temperature. It was found that the thicknesses of the low-carbon ferrous metal insert and of the nickel insert must be at least $\frac{1}{2}$ and $\frac{1}{4}$, respectively, the diffusion length of C in Fe for the given heating conditions. Furthermore, it was found that the necessary thicknesses of the inserts are proportional to the square root of the time for which heating is performed.

EXAMPLE 2

In this example, Example 1 was repeated except that various Fe—Ni—Cr alloy inserts having the chemical various compositions shown in Table 2 were used in place of the nickel sheet of Table 1.

Figure 8:
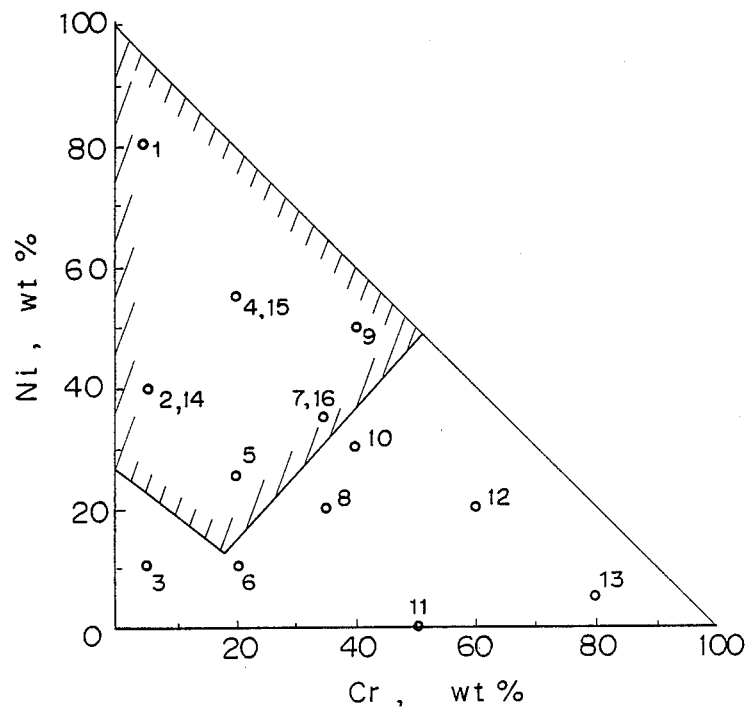
FIG. 8 is a graph showing the Ni and Cr contents of the chemical compositions shown in Table 2.

FIG. 8 is a graph plotting the Ni and Cr content of the chemical compositions shown in Table 2. The reference numerals in FIG. 8 correspond to the alloy numbers of Table 2. The hatched area in the figure indicates the bounds on the Ni and Cr content of a nickel alloy insert in accordance with the present invention.

TABLE 2

| Alloy No. | C | Cr | Ni | Fe | Others |
|---|---|---|---|---|---|
| 1 | 0.01 | 5.0 | 80.0 | bal. | Mo = 2.8 |
| 2 | 0.03 | 5.1 | 40.0 | bal. | |
| 3 | 0.04 | 4.8 | 10.5 | bal. | |
| 4 | 0.01 | 19.9 | 55.3 | bal. | |
| 5 | 0.03 | 20.3 | 25.7 | bal. | Si = 4.6 |
| 6 | 0.05 | 20.8 | 10.3 | bal. | |
| 7 | 0.03 | 34.5 | 35.6 | bal. | |
| 8 | 0.01 | 35.2 | 20.2 | bal. | |
| 9 | 0.04 | 40.2 | 50.2 | bal. | |
| 10 | 0.02 | 39.8 | 30.4 | bal. | Si = 2.1 |
| 11 | 0.03 | 50.3 | 0.24 | bal. | |
| 12 | 0.01 | 59.6 | 20.4 | bal. | |
| 13 | 0.03 | 79.8 | 5.5 | bal. | |
| 14 | 0.15 | 5.4 | 39.8 | bal. | |
| 15 | 0.07 | 20.6 | 54.8 | bal. | Al = 0.78 |
| 16 | 0.09 | 34.9 | 35.1 | bal. | |

The shear strengths of the titanium-clad steels which were obtained using these Fe—Ni—Cr alloys as inserts were measured after hot rolling. The initial thickness of the low-carbon ferrous metal insert was 200 μm. The initial thickness of the nickel alloys was varied from 50 μm to 1000 μm.

Figure 9:
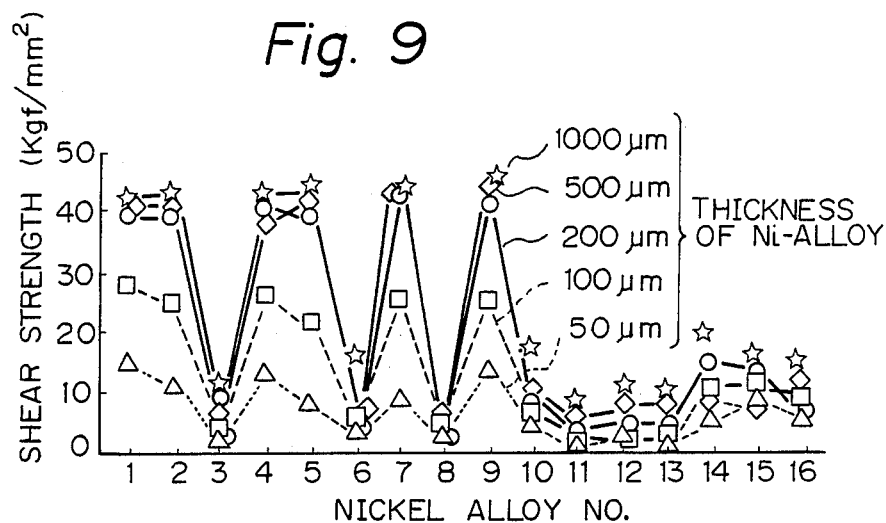
FIG. 9 is a graph summarizing the test results of Example 2.

The test results are summarized graphically in FIG. 9.

As is apparent from FIG. 9, the shear strength was excellent for the samples having an insert whose chemical composition fell within the hatched area in FIG. 8 together with a low-carbon ferrous metal insert, provided that the initial thickness of the nickel alloy insert was 200 μm or more. However, when the nickel alloy contained carbon in an amount of larger than 0.05% by weight, or when the alloy composition fell outside the range indicated in FIG. 8, i.e., when the alloy was of a ferrite phase, the shear strength was rather low even if the thickness of the Ni-alloy insert was increased. It is thought that in this case, carbon from the base steel (SS41) reaches the interface between the ferrous metal insert and titanium cladding through the Ni alloy insert as well as the low-carbon steel insert to form TiC.

Since the diffusion distance for the C for the above-described temperature and heating period is about 400 μm, substantially no carbon from the steel base sheet reaches the interface between the titanium cladding and the low-carbon ferrous metal sheet when the initial thickness of the low-carbon ferrous metal insert is at least 400 μm. This means that the shear strength of the rolled clad steel is not influenced by the alloy composition of the nickel insert when the insert is thick.

Figure 10:
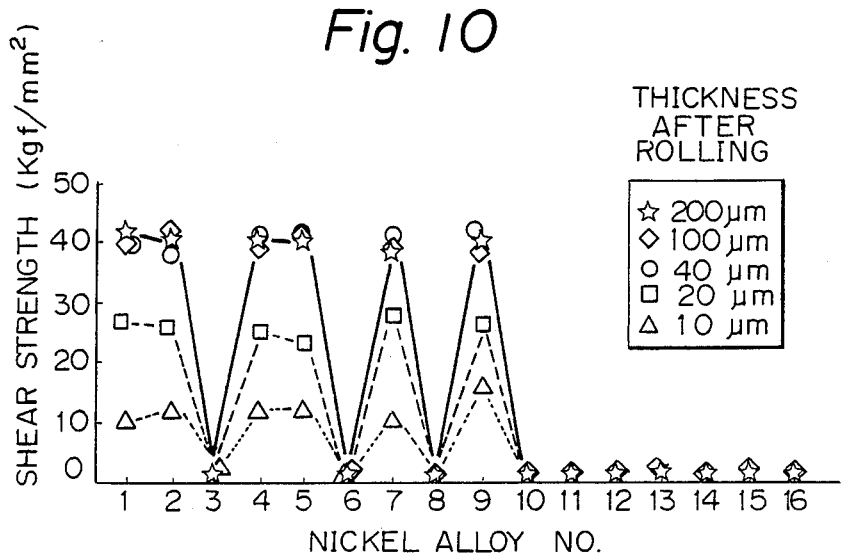
FIG. 10 is a graph showing the change in shear strength.

FIG. 10 shows the shear strength after stress relief heat treatment was carried out at 600° C. for one hour in air. As is apparent from this figure, samples which had nickel inserts whose chemical compositions fell within the range defined by the hatched area in FIG. 8 and contained 0.05% by weight or less of carbon exhibited good shear strength after heat treatment. On the other hand, if the nickel alloy insert had a chemical composition falling outside the range defined in FIG. 8 or it had a carbon content of larger than 0.05% by weight, it is noted that the shear strength after heat treatment markedly decreased compared with that of the as-rolled material. This is because the thickness of the nickel alloy was reduced to about one-fifth of its initial thickness and the diffusion rate of C in the low-carbon steel and ferrite alloys was rather high.

EXAMPLE 3

In this example, Example 1 was repeated except that a low-carbon ferrous metal insert was bonded to a pure nickel insert prior trolling.

First, a ferrous bonded layer was deposited on one surface of a pure nickel sheet by means of electroplating using an electroplating bath comprising 250 g/l of FeSO$_4$·7H$_2$O, and 120 g/l of (NH$_4$)$_2$SO$_4$ with a pH of 2.3 at 45° C. The thus-prepared bonded layer had a thickness ranging up to 2000 μm. The nickel insert with a ferrous insert electrodeposited thereon was placed between a steel base sheet (SS41) and a titanium sheet with the nickel surface facing the steel base sheet.

The shear strength of the titanium-clad steel was measured after hot rolling. The initial thickness of the nickel layer was 300 μm.

Figure 11:
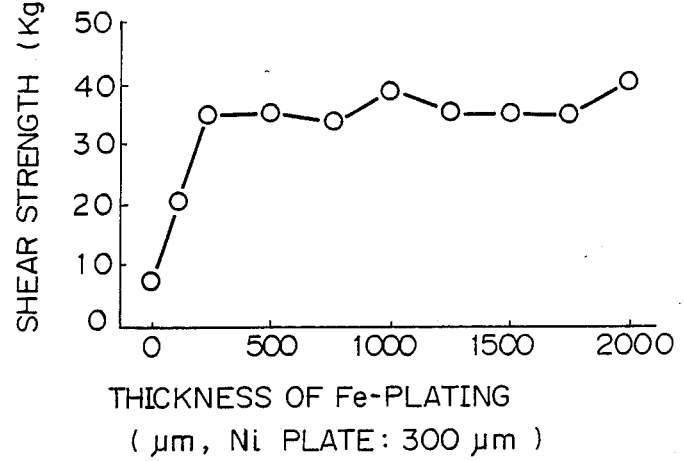
FIG. 11 is a graph showing the relationship between the thickness of Fe plating and shear strength.

The test results are summarized in FIG. 11.

As is apparent from FIG. 11, the shear strength decreased when the thickness of the ferrous metal deposited layer was less than 250 μm. This is because nickel diffused into the titanium through the ferrous deposited layer to form a brittle intermetallic Ti—Ni compound.

After stress relief heat treatment carried out at 600° C. for one hour in air, the shear strength of the present invention did not decrease to any extent.

EXAMPLE 4

A titanium-clad steel was formed in the same manner as for Example 3 except that a low-carbon ferrous metal insert was provided on a pure nickel insert by electroless plating instead of electroplating. The shear strength of the resulting titanium clad steel was substantially the same as that of Example 3.

EXAMPLE 5

In this example, a nickel insert was electrodeposited on a low-carbon steel insert. The deposition was carried out using a plating bath comprising 150 g/l of nickel sulfate, 15 g/l of ammonium chloride, and 15 g/l of boric acid with a pH of 6.0 at 25° C. The thickness of the deposited nickel layer was varied up to 1000 μm. The resulting composite insert was placed between a steel base sheet (SS41) and a titanium sheet with the nickel layer facing the steel base sheet. The thickness of the low-carbon steel sheet was varied up to 500 μm.

Figure 12:
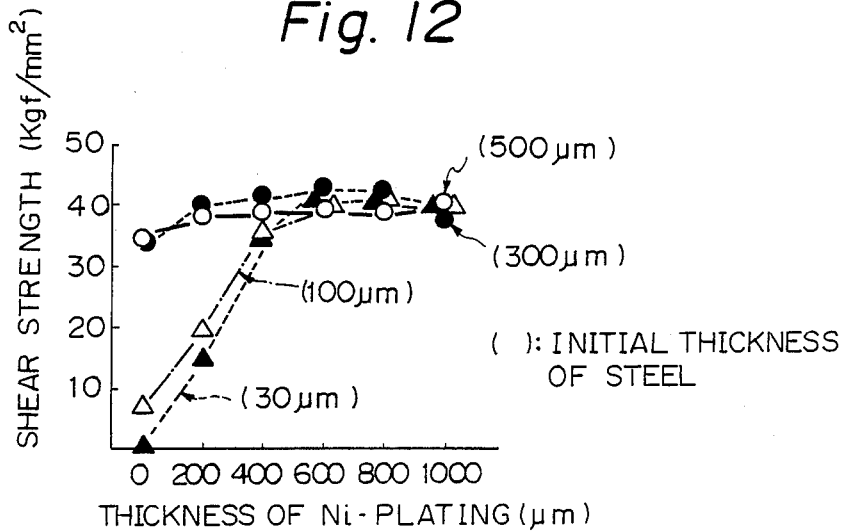
FIG. 12 is a graph showing the relationship between the thickness of Ni plating and shear strength.

The clad assembly was heated and hot rolled in the same manner as for the previous examples, and the shear strength was measured after rolling. The results of measurements are summarized in FIG. 12.

When the thickness of the low-carbon steel insert was 300 μm thick or more, the measured shear strength was very high without a nickel bonded layer. This is because a relatively thick low-carbon steel insert can act as a barrier to prevent the C from the base steel (SS41) from diffusing to the interface between the Ti cladding and the low-carbon steel insert. In addition, the reason why the shear strength decreases when the thickness of the low-carbon steel insert and the nickel electroplating layer is thin is that Ti—Ni intermetallic compounds as well as TiC brittle phases are formed.

Figure 13:
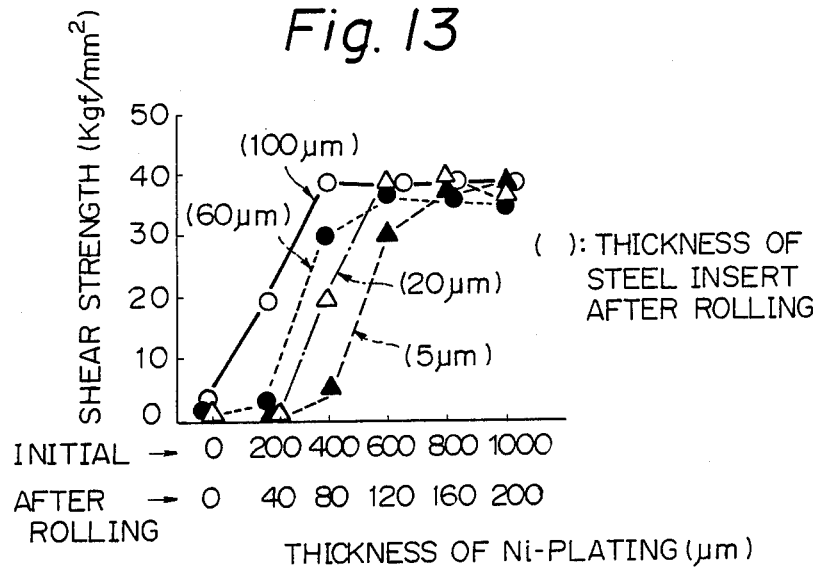
FIGS. 13 through 15 are graphs summarizing experimental results of Example 3.

FIG. 13 shows the test results of a shearing test performed after heating the hot rolled clad steel composite of Example 5 at 600° C. for one hour in air. As is apparent from FIG. 13, the shear strength decreases when the thickness of the nickel plating is thin. This is because the thickness of the low carbon steel insert and the nickel plating is reduced during hot rolling and the diffusion rate of C in Fe at a high temperature, such as during hot rolling, is rather high. However, as the thickness of the nickel plating increases, the shear strength increases. This means that the nickel plating can act as a barrier to prevent carbon from the steel base sheet (SS41) from diffusing.

EXAMPLE 6

Example 5 was repeated except that a nickel insert was deposited on a low-carbon steel insert by electroless plating, by vapor deposition, or by spraying. In each case, the resulting titanium-clad steel had a good shear strength.

EXAMPLE 7

Nickel plating was applied to a steel base sheet (SS41) using the same electroplating procedures as for Example 5. After nickel plating, a clad assembly was prepared by placing a low-carbon steel insert on the nickel plating and a titanium sheet atop the low-carbon steel insert. The initial thickness of the nickel plating was varied to 1000 μm, and the initial thickness of the low-carbon steel insert was 100 μm. After hot rolling the clad assembly, a shearing test was carried out on the resulting clad steel.

Figure 14:
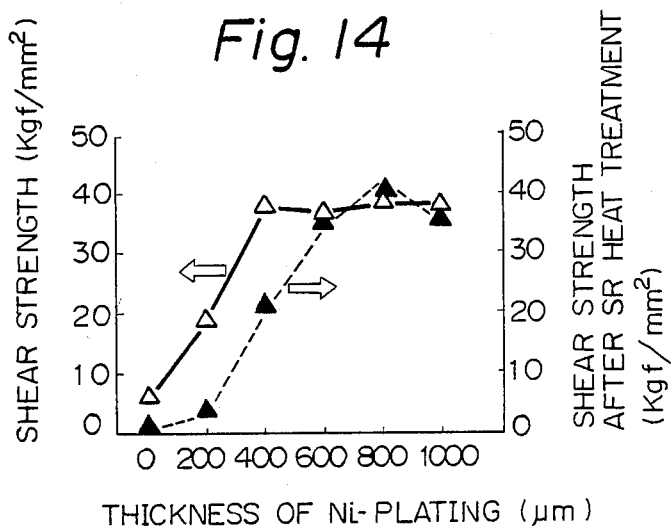

The test results are summarized in FIG. 14. The test data after heat treatment at 600° C. for one hour in air are also shown therein. The same tendency as in FIG. 13 was noted.

EXAMPLE 8

Example 7 was repeated with the exception that nickel plating was applied to a steel base sheet by electroless plating, vapor deposition, or spraying instead of by electroplating. In each case, the characteristics of the resulting titanium-clad steel were substantially the same as those shown in FIG. 14.

EXAMPLE 9

Figure 15:
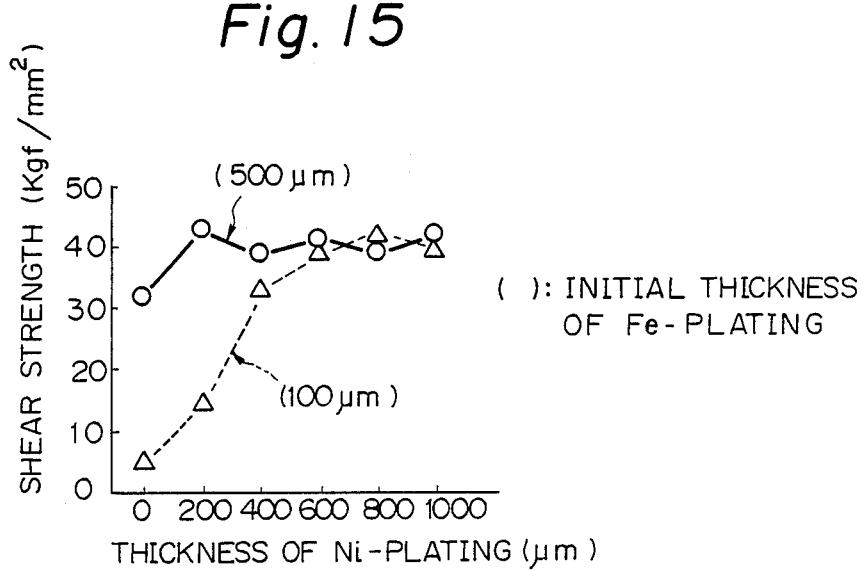

In this example, a nickel inserted was electroplated on one surface of a steel base sheet and a ferrous layer was electroplated atop this nickel plating to form a multilayer electrocoating. The electroplating of the ferrous layer and the nickel layer was carried out in the same manners as for Example 3 and Example 5, respectively. Titanium cladding was then placed on the Fe plated layer to provide a clad assembly, which was then subjected to hot rolling. A shearing test was carried out on the resulting clad steel, the results of which are shown in FIG. 15. The initial thickness of the nickel bonded layer was varied up to 1000 μm. The initial thickness of the ferrous plating was 100 μm and 500 μm. The resulting shear strength was substantially the same as in the case in which one of the inserts was in the form of plate. In addition, substantially the same level of shear strength was obtained even when the clad steel was then subjected to heating at 600° C. for one hour in air.

EXAMPLE 10

Example 9 was repeated with the exception that the nickel and ferrous layers were bonded by electroless plating, by vapor deposition, or by spraying. In each case, the resulting titanium-clad steel has a good shear strength and bonding strength.

Although the present invention has been described with respect to preferred embodiments, it is to be understood that variations and modifications may be employed without departing from the concept of the invention as defined in the following claims.

What is claimed is:

1. A titanium-clad steel comprising:
   a steel base metal;
   a nickel or nickel alloy insert which is bonded to said steel base metal;
   a low-carbon ferrous metal insert which contains at most 0.01 weight % of carbon and which is bonded to said nickel insert; and
   cladding which is made of a titanium-based metal and which is bonded to said low-carbon ferrous metal insert;
   wherein the combined thickness of said inserts is approximately 0.1–10% of the total thickness of said clad steel.

2. A titanium-clad steel as claimed in claim 1, wherein said low-carbon ferrous metal insert comprises a material selected from a low-carbon steel and industrial-grade pure iron.

3. A titanium-clad steel as claimed in claim 1, wherein said titanium-based metal is selected from titanium and alloys thereof.

4. A titanium-clad steel claimed in claim 1, wherein the combined thickness of said inserts is approximately 0.5–3.0% of the total thickness of said clad steel.

5. A titanium-clad steel as claimed in claim 1, wherein said nickel or nickel alloy consists essentially of nickel.

6. A titanium-clad steel as claimed in claim 1, wherein said nickel, or nickel alloy insert is made of a nickel alloy containing at least 25% by weight of nickel.

7. A titanium-clad steel as claimed in claim 1, wherein said nickel or nickel alloy insert is made of a nickel alloy selected from Fe—Ni—Cr—based alloys comprising:

| | |
|---|---|
| Cr ≦ 18% | Ni ≧ −0.78 Cr + 26% |
| Cr > 18% | Ni ≧ 1.13(Cr − 18%) + 12% |

8. A titanium-clad steel as claimed in claim 1, wherein said nickel or nickel alloy insert and/or low-carbon ferrous metal insert ar provided in the form of a bonded layer selected from an electroplated layer, electrolessly-plated layer, vapor deposited layer, and sprayed layer.

* * * * *